US005327274A

United States Patent [19]

Yamaguchi

[11] Patent Number: 5,327,274

[45] Date of Patent: Jul. 5, 1994

[54] OPTICAL CALCULATING APPARATUS

[75] Inventor: Akira Yamaguchi, Kyoto, Japan

[73] Assignee: Sharp Kabushiki Kaisha, Osaka, Japan

[21] Appl. No.: 929,007

[22] Filed: Aug. 13, 1992

[30] Foreign Application Priority Data

Aug. 13, 1991 [JP] Japan ................................ 3-203022

[51] Int. Cl.[5] ...................... G02F 1/03; G02F 1/1343; G02F 3/00; G02F 3/02

[52] U.S. Cl. ...................................... 359/107; 359/53; 359/87; 359/254; 359/259

[58] Field of Search .................. 359/53, 87, 107, 108, 359/303, 39, 250, 254, 259

[56] References Cited

U.S. PATENT DOCUMENTS

| | | | |
|---|---|---|---|
| 2,936,380 | 5/1960 | Anderson | 359/108 |
| 3,391,970 | 7/1968 | Sincerbox | 359/107 |
| 3,466,433 | 9/1969 | Duda et al. | 359/108 |
| 3,614,754 | 10/1971 | Cummins | 359/108 |
| 3,883,227 | 5/1975 | Kobayashi et al. | 359/87 |
| 3,989,355 | 11/1976 | Wilmer | 359/53 |
| 4,592,004 | 5/1986 | Bocker et al. | 359/107 |
| 4,892,370 | 1/1990 | Lee | 359/107 |
| 4,936,658 | 6/1990 | Tanaka et al. | |
| 5,071,231 | 12/1991 | Armitage et al. | 359/53 |

FOREIGN PATENT DOCUMENTS

| | | |
|---|---|---|
| 644726 | 1/1989 | Japan . |
| 1102531 | 4/1989 | Japan . |
| 1255836 | 10/1989 | Japan . |

*Primary Examiner*—Martin Lerner

[57] ABSTRACT

An optical calculating apparatus which can perform operations by optically controlling incident light and hence perform such operations very rapidly and in parallel is provided. A unit component is composed of a pair of electrodes and a modulation material layer sandwiched therebetween and consisting of a material such as a liquid crystal in which the molecular struture is twisted by an applied electric field to change the transmission amount and transmission direction of light incident from the outside, thereby performing a modulation. The optical calculating apparatus is constructed by stacking or laminating such unit components in n stages. The unit component of the first stage has a structure in which the modulation material layer is sandwiched between a pair of the electrodes and input light enters into the modulation material layer in the direction perpendicular to the arrangement direction of the electrodes.

11 Claims, 12 Drawing Sheets

Fig. 2
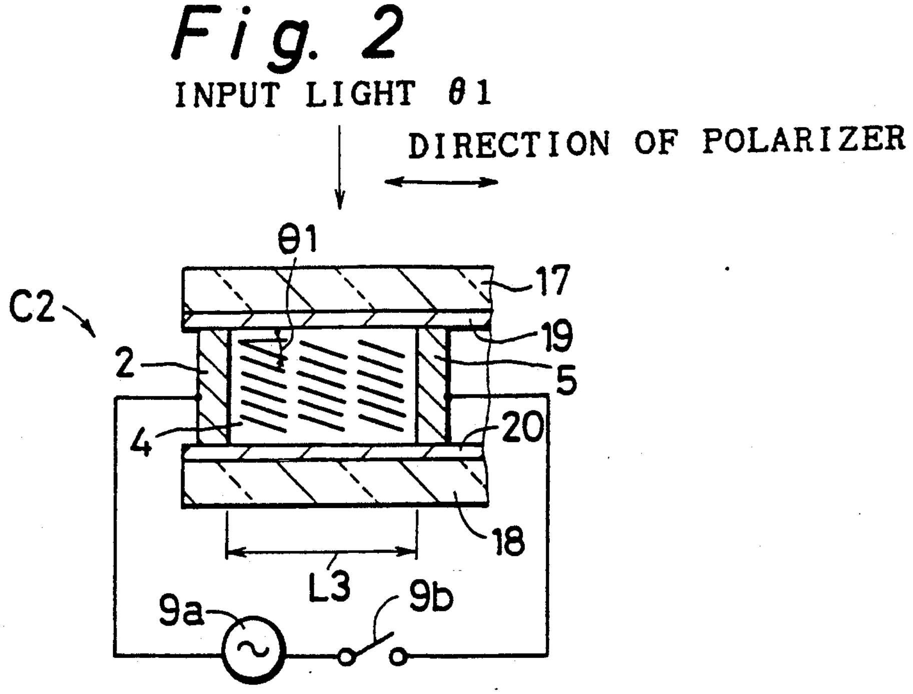
Fig. 3 (1)
Fig. 3 (2)
Fig. 3 (3)
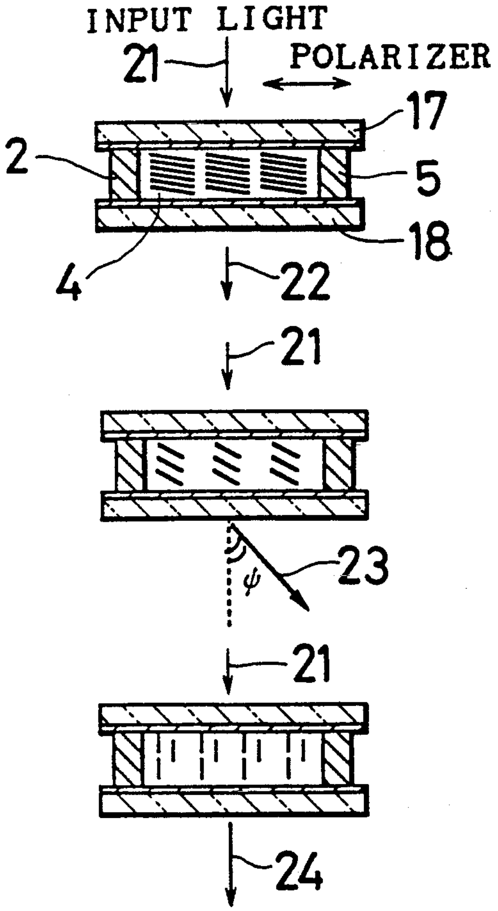

Fig. 6(1)
Fig. 6(2)
Fig. 6(3)
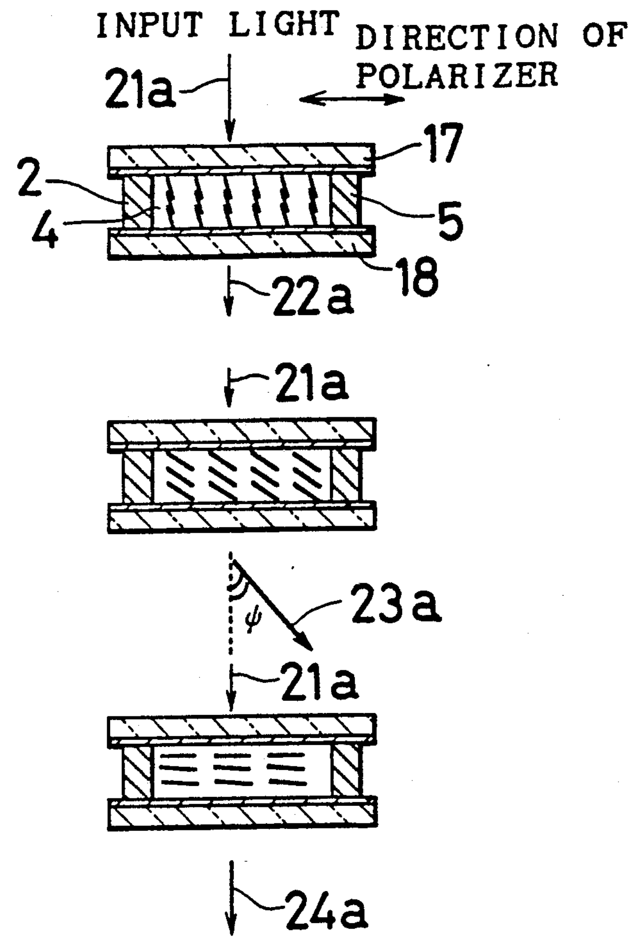
Fig. 7
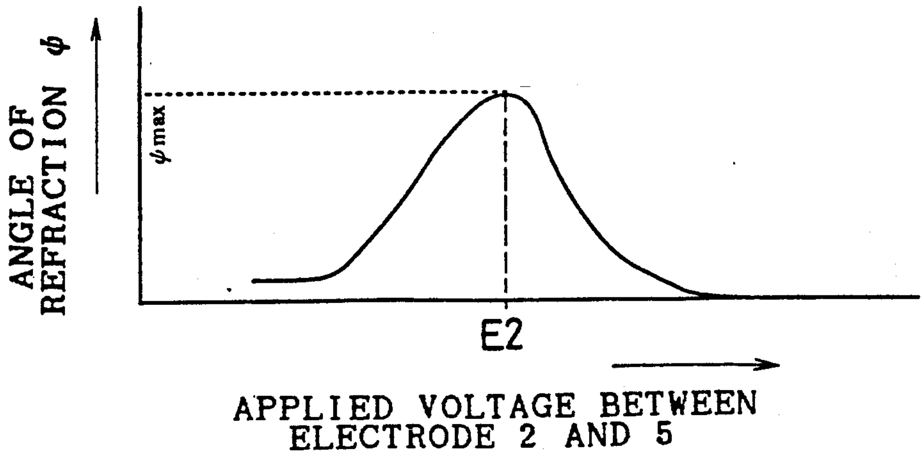

Fig. 11 (1)
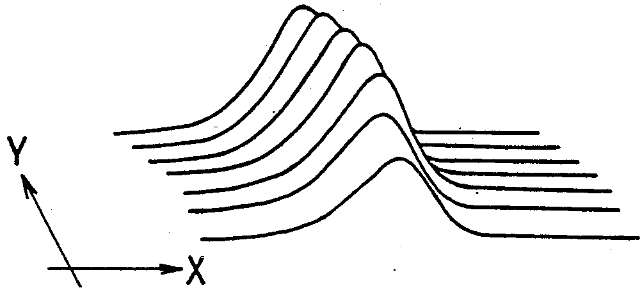
Fig. 11 (2)
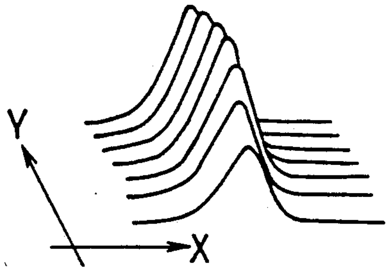

Fig. 13 (1)
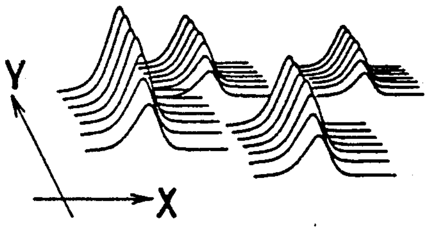
Fig. 13 (2)
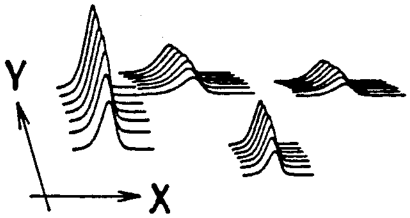

OPTICAL CALCULATING APPARATUS

BACKGROUND OF THE INVENTION

1. Field of the Invention

This invention relates to an optical calculating apparatus in which a material for example a liquid crystal is employed and the transmission amount and/or transmission direction of transmitted light are controlled so that a filter operation, a fuzzy operation or the like wherein coefficients are prefixed is performed by controlling light.

2. Description of the Related Art

A typical device for modulating incident light and utilizing transmitted light which has been modulated is a liquid crystal display device. In a liquid crystal display device, transparent electrodes are formed on a pair of glass substrates, a liquid crystal layer is sandwiched between the glass substrates, and a polarizing plate is disposed outside the glass substrates. In accordance with the strength of an electric field applied between the electrodes, the transmittance and interruption of light incident on the liquid crystal display device are switched over.

Such a liquid crystal display device is used literally as a display device for viewing transmitted light, or in a system wherein transmitted light from the liquid crystal display device is irradiated on a photosensitive layer having an electric conductivity which varies according to the amount of incident light and a latent image is formed on the photosensitive layer, thereby obtaining a print output. In the latter case, the liquid crystal display device functions as a so-called liquid crystal shutter.

When a plurality of liquid crystal panels are used in these examples of the prior art, these liquid crystal panels are arranged in parallel with respect to the propagation direction of light. The series arrangement of liquid crystal panels is employed only in a special case such as that they are used to compensate the color formation when obtaining a predetermined color. Namely, such an optical output which has passed through or reflected from a device for modulating incident light is used only in the form of a display or printed matter, and is not used to realize the function of performing any kind of computation or operation in the device.

When a plurality of liquid crystal panels are arranged in series with respect to the propagation direction of light and the modulation state for incident light of each liquid crystal panel is previously set, an optical output in the case that an incident light is given can be obtained very rapidly. Moreover, it is possible to perform optical operations of this kind in parallel. Namely, it has been desired to develop a configuration in which operations are performed using such a device for modulating incident light.

SUMMARY OF THE INVENTION

It is an object of the invention to provide an optical calculating apparatus which can eliminate the above-discussed technical problems, perform operations by optically controlling incident light and hence perform such operations very rapidly and in parallel.

The optical calculating apparatus of the invention is characterized in that a plurality of unit components each having a pair of electrodes and a transmittance control layer are laminated, or stacked in piles, or overlapped, the transmittance control layer being made of a material having a transparency in which the transmittance amount and/or transmittance direction of incident light vary in accordance with the strength of an electric field applied between the electrodes, and the apparatus comprises control means for adjustably applying a driving voltage to each of the unit components and controlling the strength of an electric field between the electrodes.

In another aspect of the invention, the optical calculating apparatus of the invention is characterized in that a plurality of unit components each consisting of a pair of electrodes and a transmittance control layer are laminated, the transmittance control layer being made of a material having a transparency in which the transmittance amount and/or transmittance direction of incident light vary in accordance with the strength of an electric field applied between the electrodes, the region of each of the unit components through which incident light transmits has a predetermined area, and light which has passed through the lamination of the unit components is converted to an electrical signal by a photoelectric converting device.

Furthermore, the unit components of each layer are divided into $(\frac{1}{2})^j$ regions (where j is an integer) in the sequence of the thickness direction.

Furthermore, the electrodes are spaced in the direction perpendicular to the thickness direction with facing each other.

Furthermore, the electrodes are spaced in the thickness direction with facing each other and transparent.

Furthermore, a voltage is applied across electrodes facing each other so that the light transmittance is 100% or 0%.

Furthermore, a voltage is applied across electrodes facing each other so that the light transmittance has a value between 100% and 0%.

Furthermore, a pair of individual electrodes 2 and 3 which face one common electrode 5 are disposed.

In an optical calculating apparatus according to the invention, the transmission amount and/or transmission direction of light incident on the unit components changes in accordance with the strength of an electric field which is applied between a pair of electrodes by the control means. Therefore, by individually controlling the transmission amount and transmission direction of light in a respective unit component, operations such as the sum, product and exclusive OR of image information of transmitted light which is realized by the transmission amount distribution and transmission direction of each unit component can be performed.

When the transmittance state of transmitted light which is emitted from the plurality of unit components is set so as to be a mask of a predetermined image, image processes such as the contour extraction may be performed in parallel and very rapidly on an input image.

In other words, when the amount of transmitted light of each unit component is controlled to be switched from 100% to 0% and vice versa, the present apparatus may be adapted to a problem in which the solution can be uniquely determined, such as the logical operation and digital operation of image information realized by the unit components. In contrast, when the amount of transmitted light changes to an arbitrary degree from 0% to 100%, image information realized by the unit components has a so-called gray scale, and hence it becomes possible to perform an analog operation of such image information. According to the invention, moreover, it is possible to realize a fuzzy operation in which the solution is given in the form of a probability distribution, and the above-mentioned feature extraction process of an image.

The employment of a CCD (charge coupled device) as the photoelectric converting device allows a high precision optical conversion, storage of operation results, high density mounting to be achieved, thereby making the whole of such an optical calculating apparatus highly accurate and of high density.

Furthermore, when a predetermined specific operation is to be rapidly performed, the electric field applied between the electrodes of each unit component may be set in advance of the operation process, thereby allowing a high speed process which does not depend on the control time of the electrodes and the variation time of the material constituting the transmittance control layer, to be performed.

As described above, according to the invention, the transmission amount and/or transmission direction of light incident on the unit components changes in accordance with the strength of an electric field which is applied between a pair of electrodes by the control means. Therefore, by individually controlling the transmission amount and transmission direction of light in a respective unit component, operations such as the sum, product and exclusive OR of image information of transmitted light which is realized by the transmission amount distribution and transmission direction of each unit component can be performed.

When the transmittance state of transmitted light which is emitted from the plurality of unit components is set so as to be a mask of a predetermined image, image processes such as a contour extraction may be performed in parallel and very rapidly on an input image.

In other words, when the amount of transmitted light of each unit component is controlled to be switched from 100% to 0% and vice versa, the present apparatus may be adapted to a problem in which the solution can be uniquely determined, such as a logical operation and digital operation of image information realized by the unit components. In contrast, when the amount of transmitted light changes to an arbitrary degree from 0% to 100%, image information realized by the unit components has a so-called gray scale, and hence it becomes possible to perform an analog operation of such image information. According to the invention, moreover, it is possible to realize a fuzzy operation in which the solution is given in the form of a probability distribution, and the above-mentioned feature extraction process of an image.

The employment of a CCD (charge coupled device) as the photoelectric converting device allows a high precision optical conversion, storage of operation results, high density mounting to be achieved, thereby making the whole of such an optical calculating apparatus high accurate and high density.

Furthermore, when a predetermined specific operation is to be rapidly performed, the electric field applied between the electrodes of each unit component may be set in advance of the operation process, thereby allowing a high speed process which does not depend on the control time of the electrodes and the variation time of the material constituting the transmittance control layer, to be performed.

BRIEF DESCRIPTION OF THE DRAWINGS

Other and further objects, features, and advantages of the invention will be more explicit from the following detailed description taken with reference to the drawings wherein:

FIG. 2 is a sectional view partly showing the unit component C2 shown in FIG. 1.

FIGS. 3(1), 3(2) and 3(3) are sectional views showing the light transmittance in the unit component C2 shown in FIG. 2.

FIGS. 6(1), 6(2) and 6(3) are sectional views showing the light transmittance in the unit component C2 shown in FIG. 5.

FIG. 7 is a graph showing the relationship between the voltage applied between electrodes 2 and 5 shown in FIGS. 5 and 6 and the angle of refraction Ψ.

FIGS. 11(1) and 11(2) are views showing the distribution of transmitted light 30 and 31 in the embodiment shown in FIG. 10.

FIGS. 13(2) and 13(2) are views showing the distribution of transmitted light 30 and 31 in the embodiment shown in FIG. 12.

DETAILED DESCRIPTION OF THE INVENTION

Figure 1:
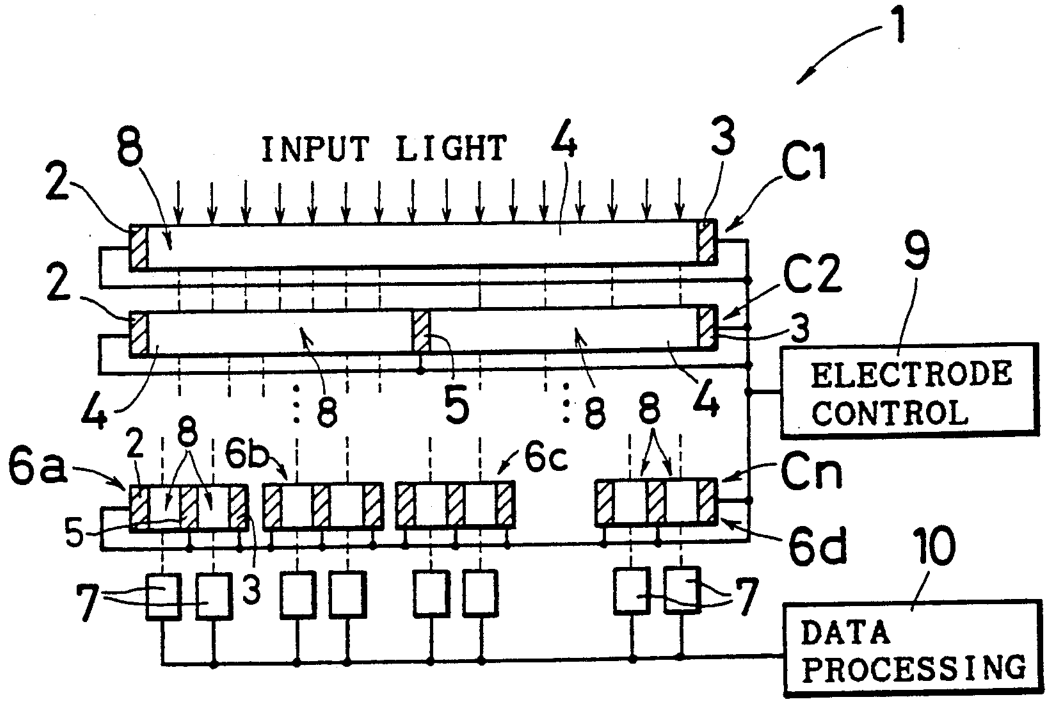
FIG. 1 is a diagram showing the configuration of an optical calculating apparatus 1 which is an embodiment of the invention.

Now referring to the drawing, preferred embodiments of the invention are described below.

FIG. 1 is a diagram showing the configuration of an optical calculating apparatus 1 which is an embodiment of the invention, and FIG. 2 is a cross-sectional view of unit components C2 used in the optical calculating apparatus 1. In the embodiment, each of the unit components C, which inclusively refers to C1, C2, . . . , Cn is stacked in piles and has a pair of electrodes 2 and 3 and a modulation material layer 4 such as a liquid crystal sandwiched therebetween and consisting of a material such as a liquid crystal in which the molecular structure is twisted by an applied electric field to change the transmission amount and/or transmission direction of light incident from the outside, thereby performing a modulation. The optical calculating apparatus 1 is constructed by stacking or laminating such unit components C in n stages. The unit component C1 of the first stage has a structure in which the modulation material layer 4 is sandwiched between a pair of the electrodes 2 and 3 and input light enters into the modulation material layer 4 in the direction perpendicular to the arrangement direction of the electrodes 2 and 3.

The unit component C2 of the second stage into which transmitted light from the unit component C1 of the first stage enters has a structure in which two unit components each having a length equal to the half of that of the unit component C1 along the direction from left to right in FIG. 1 are juxtaposed. For example, at the midpoint of a pair of the electrodes 2 and 3, one electrode 5 facing the electrodes 2 and 3 or two electrodes 5 respectively facing the electrodes 2 and 3 are disposed as other embodiments.

In the unit component Cn of the nth stage, component elements *6a*, *6b*, . . . , *6d* having a structure which is a reduction of the unit component C2 of the second stage along the direction from left to right in FIG. 1 are arranged in parallel with the arrangement direction of the electrodes 2 and 3. The unit components in each layer define regions and are divided into $2^j$ regions (where j is an integer) in sequence of a thickness direction of the pile. When, in each of the component elements *6a*–*6d*, the number of the modulation material layers 4 of transmission portions 8 each of which consists of two of the electrodes 2, 3 and 5 and the modulation material layer 4 of transmission portion 8 sandwiched therebetween is k, a k number of photo detectors 7 which function as photoelectric converters are arranged for each of the modulation material layers 4. For example, the photo detectors 7 consist of CCDs (charge coupled devices), etc. The unit component Ci (i=1 to n) of each stage is controlled by an electrode control circuit 9 such as a computer, in the unit of the transmission portion 8 which consists of two of the electrodes 2, 3 and 5 and the modulation material layer 4 sandwiched therebetween. On the other hand, the photo detectors 7 are coupled to a data processing circuit 10 such as a computer so that obtained image data are subjected to a data process.

In FIG. 1, for the convenience' sake of drawing, electrodes 2, 3 and 5 are connected to an electrode control circuit 9 with a solid line. However, electrodes 2, 3 and 5 are actually connected to an electrode control circuit 9 via individual line.

Similarly, for the convenience' sake of drawing, a data processing circuit 10 is connected respectively to photo detectors 7 via a solid line.

FIG. 2 is a sectional view of the unit component C2. A liquid crystal 4 which is the transmittance control layer is interposed between a pair of transparent glass plates 17 and 18. The common electrode 5 and individual electrode 2 are arranged in the direction (direction from left to right in FIGS. 1 and 2) which is perpendicular to the thickness direction (direction from top to bottom in FIGS. 1 and 2). The other individual electrode 3 is arranged contrary in the same manner as the individual electrode 2. A polarizer 19 made of polyimide is disposed on the glass plate 17 into which light enters, and an analyzer 20 on the glass plate 18 from which transmitted light leaves. The analyzer 20 also is made of polyimide. The glass plates 17 and 18 have a thickness of less than 1 mm, and the polyimide layers 19 and 20 a thickness of 50 to 100 nm. The distance L3 between the electrodes 2 and 5 may be shorter than for example 200 μm. The control circuit 9, which is shown in a simplified manner and indicated by reference numeral *9a* in FIG. 2, applies a voltage of 5 to 500 V between the electrodes 2 and 5 through a switch *9b*.

The voltage is applied between the common electrode 5 and one of the individual electrodes 2 and 3 so that the light transmittance of the modulation material layer 4 has a value of 100% or 0%, or alternatively so that the light transmittance has a value between 100% and 0%. Since the common electrode 5 can be used in common to both the individual electrodes 2 and 3, the construction can be simplified. When the optical intensity of incident light is given by Ii and that of transmitted light by Io, the light transmittance is expressed by Io/Ii.

When, regarding the dielectric constant of the liquid crystal 4, the dielectric constant which is parallel to the axial direction of molecules in a slender molecular structure of the liquid crystal is indicated by E1 and that which is perpendicular to the axial direction of molecules as E2, the following relation is considered:

$$\Delta\epsilon=\epsilon 1-\epsilon 2.$$

When the liquid crystal 4 is an n-type liquid crystal, i.e., $\Delta\epsilon<0$, the polyimide layers 19 and 20 are made of polyimide for the horizontal orientation, rubbed in one direction and arranged so that their polarizing axes are parallel to each other. In this way, the glass plates 17 and 18 are arranged so as to be parallel to each other. The axial direction of molecules of the liquid crystal 4 intersects with the horizontal direction of the glass plates 17 and 18 at an angle $\theta 1$ of, for example, 2° to 3°.

Figure 4:
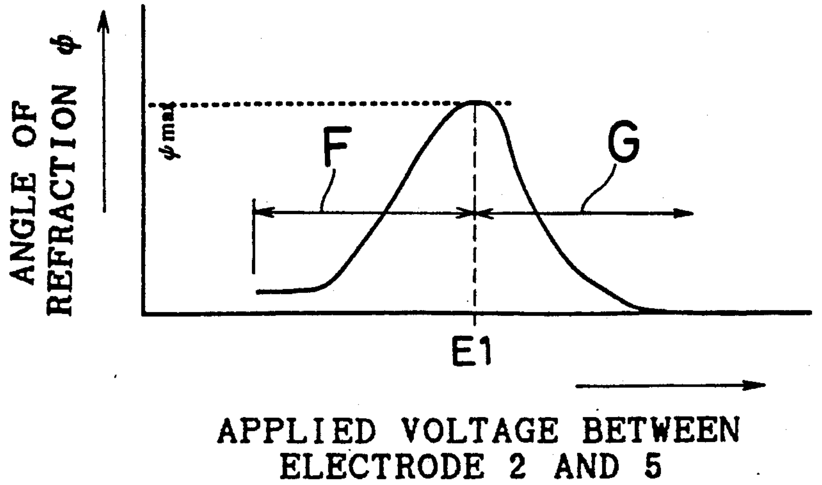
FIG. 4 is a graph showing the relationship between the voltage applied between electrodes 2 and 5 shown in FIGS. 2 and 3 and the angle of refraction Ψ.

FIG. 3 is a diagram showing incident light and transmitted light obtained when a voltage is applied between the electrodes 2 and 5 of FIG. 2, and FIG. 4 is a graph showing the relationship between the voltage applied between the electrodes 2 and 5 and the angle of refraction ψ which indicates the transmittance direction of the unit component C2. The angle of refraction ψ has a value which is determined depending upon the magnitudes of the indices of refraction and double refraction. In the state shown in (1) of 1 FIG. 3, no voltage is applied between the electrodes 2 and 5, and incident light 21 is output as it is to become transmitted light 22.

When a voltage E1 shown in FIG. 4 is applied between the electrodes 2 and 5, incident light 21 is transmitted with angular-displaced by the angle of refraction ψ as indicated by reference numeral 23 in (2) of FIG. 3. When a higher voltage is applied between the electrodes 2 and 5 as shown as FIG. 3 (3), incident light 21 is transmitted as it is, as indicated by reference numeral 24. The angle of refraction ψ shown in FIG. 4 varies depending upon the voltage between electrodes 2 and 5, and its characteristic is asymmetric with respect to the voltage E1, that is, the characteristic in the voltage range F differs from that in the voltage range G. By changing the voltage in either of the voltage ranges F and G, the angle of refraction ψ can be changed depending upon the voltage between the electrodes 2 and 5.

Figure 5:
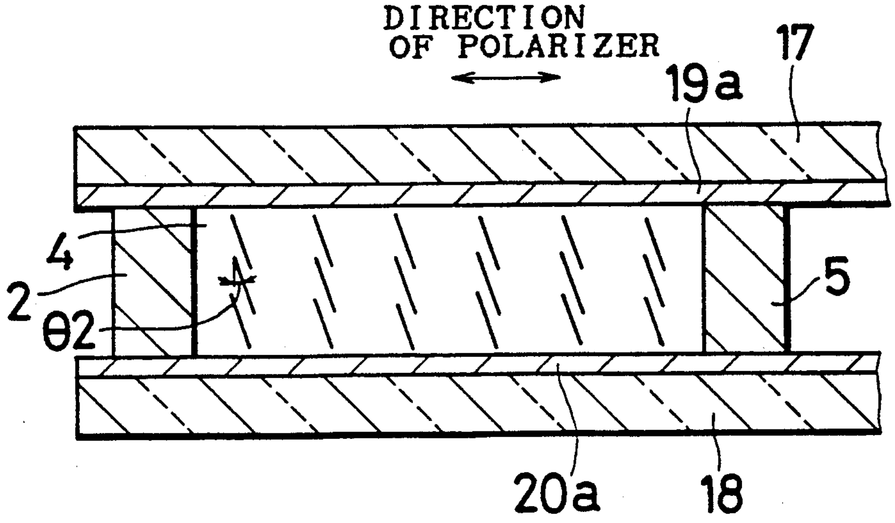
FIG. 5 is a sectional view of a unit component C2 in another embodiment of the invention.

FIG. 5 is a sectional view of a unit component C2 in another embodiment of the invention. The embodiment is constructed in a similar manner as the embodiment shown in FIGS. 2 to 4, and corresponding portions are designated by the same reference numerals. In this embodiment, $\Delta\epsilon$ is greater than zero (i.e., $\Delta\epsilon>0$), or the liquid crystal 4 is a p-type liquid crystal. Polyimide layers *19a* and *20a* are made of polyimide for the vertical orientation, and rubbed so that the rubbing in one direction is conducted in a weaker manner than that in the other direction. For example, the angle $\theta 2$ formed between the axial direction of the liquid crystal molecules and the direction perpendicular to the glass plates 17 and 18 is 1°. The other construction of the embodiment is the same as that of the above-described embodiment.

FIG. 6 is a sectional view showing the light transmittance states of the unit component C2 in the embodiment of FIG. 5, and FIG. 7 is a graph showing the relationship between the voltage applied between the electrodes 2 and 5 and the angle of refraction $\psi$ in the embodiment of FIG. 5. In the state in which no voltage is applied between the electrodes 2 and 5, as shown in (1) of FIG. 6, incident light 21*a* is transmitted as it is to become transmitted light 22*a*. When a voltage E2 shown in FIG. 7 is applied between the electrodes 2 and 5, as shown in (2) of FIG. 6, incident light 21 is transmitted with the angle of refraction $\psi$ to become transmitted light 23*a*. When a higher voltage is applied between the electrodes 2 and 5, as indicated by reference numeral 24*a* in (3) of FIG. 6, incident light 21*a* is transmitted as it is. It will be understood that the angle of refraction $\psi$ can be changed by varying the voltage applied between the electrodes 2 and 5.

Figure 8:
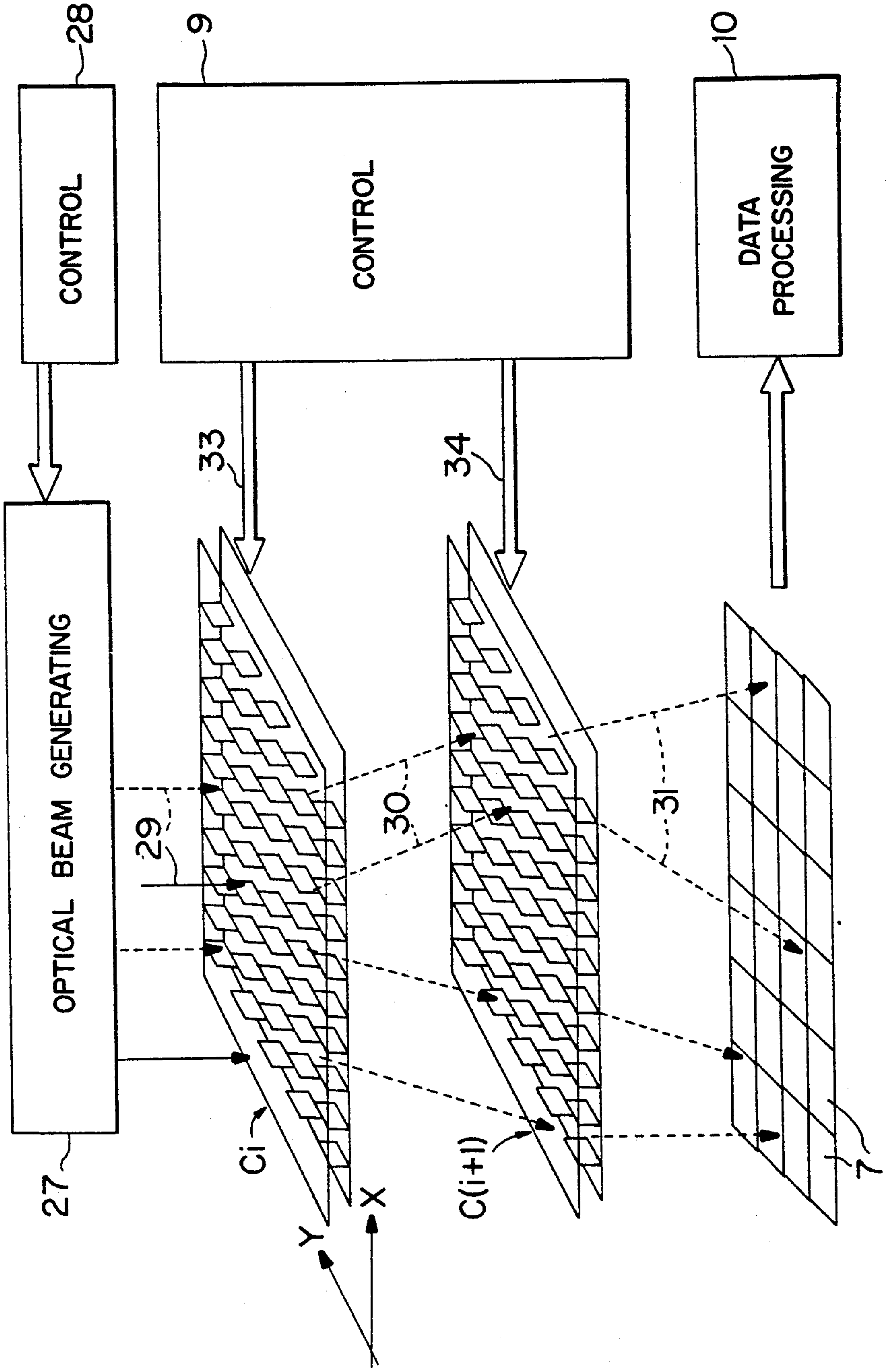
FIG. 8 is a simplified block diagram showing the whole configuration of a further embodiment of the invention.

FIG. 8 is a diagram showing a further embodiment of the invention which is partly simplified. The embodiment is constructed in a similar manner as the embodiments shown in FIGS. 1 to 7, and corresponding portions are designated by the same reference numerals. The unit components Ci and C(i+1) are laminated in a plurality of stages (in the embodiment, two stages), and optical beam generation means 27 is disposed on the upper most stage. The optical beam generation means 27 is provided with a number of laser beam devices which generate coherent light beams, i.e., laser beams, for each cell of the unit component Ci wherein a liquid crystal is sealed. The laser beam devices are selectively driven by a control circuit 28. The electrode control circuit 9 individually supplies through lines 33, 34 to each cell of the unit components Ci and C(i+1) with a voltage which is to be applied between the electrodes 2 and 3 and 5. Light incident from the optical beam generation means 27 is indicated by reference numeral 29, light obtained by refracting light 29 in the unit component Ci is indicated by reference numeral 30, and light obtained by further refracting the light in the unit component C(i+1) is indicated by reference numeral 31. The light 31 is received by photodetectors 7 which respectively correspond to the elements of the unit component Ci, and the outputs of the photodetectors 7 are supplied to a data processing circuit 10. The outputs of the photodetectors 7 constitute the output of the optical solution obtained by the unit components Ci and C(i+1), or signals which correspond to the level and position of the optical intensity caused by the variation in light transmittance of the unit components Ci and C(i+1) are supplied to the data processing circuit 10. In this way, optical operations are performed.

Figure 9:
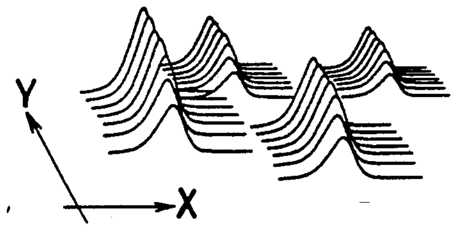
FIGS. 9(1) and 9(2) are views showing the distribution of transmitted light 30 and 31 in the embodiment shown in FIG. 8.
Figure 9:
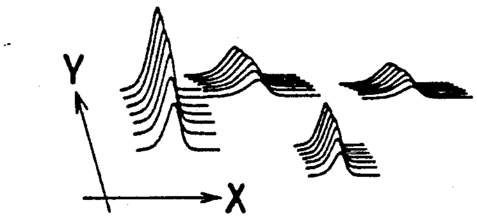

In (1) of FIG. 9, the distribution of intensity of light 30 which has passed through the unit component Ci is shown. When the light then passes through the unit component C(i+1), the light distribution shown in (2) of FIG. 9 is obtained. The unit components Ci and C(i+1) are identical in structure but driven with different voltage distributions by the electrode control circuit 9.

Figure 10:
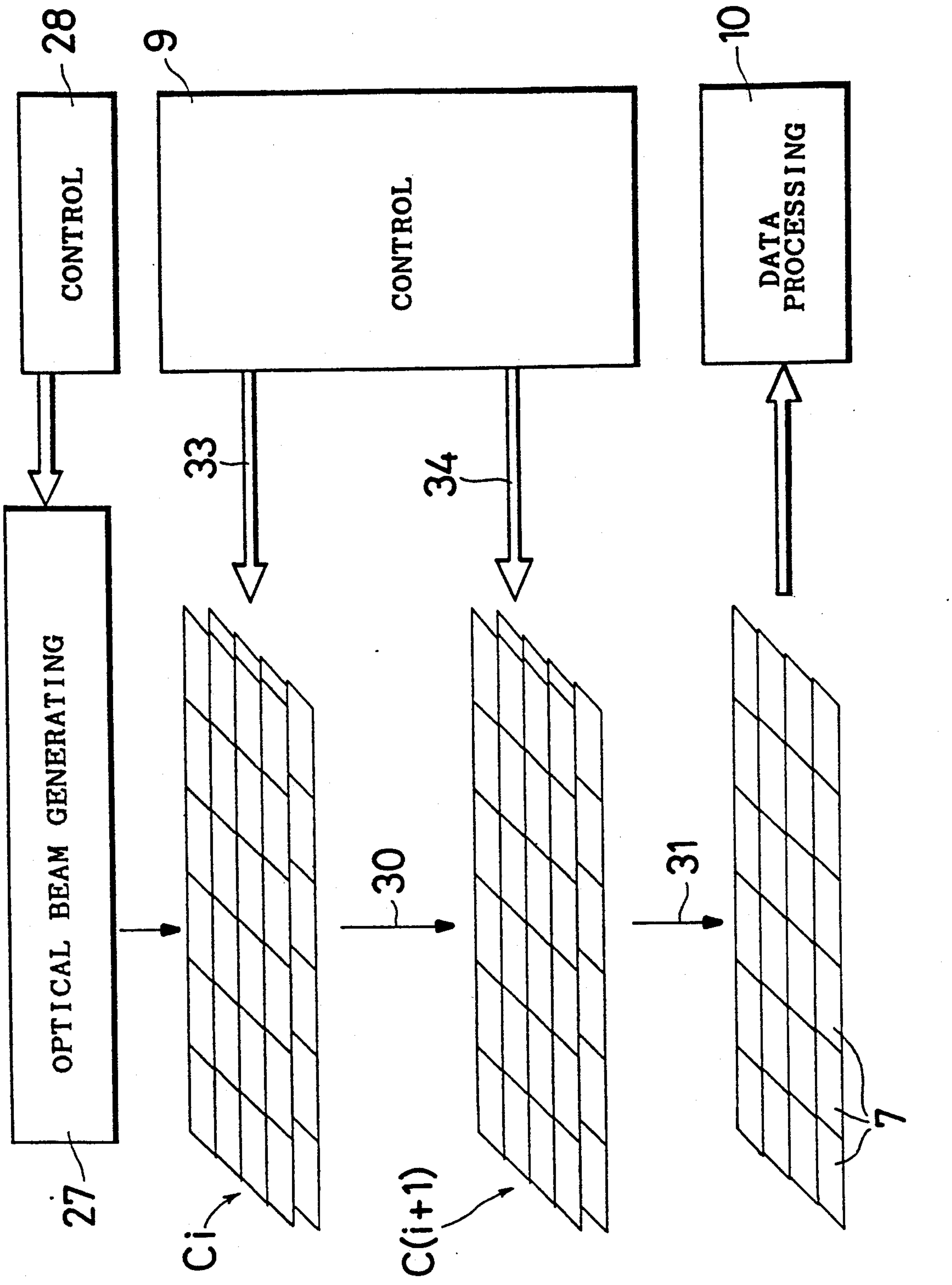
FIG. 10 is a simplified block diagram showing the whole configuration of a still further embodiment of the invention.

FIG. 10 is a perspective view of a still further embodiment of the invention. The embodiment is constructed in a similar manner as the embodiment described above, and corresponding portions are designated by the same reference numerals. Coherent laser light from the optical beam generation means 27 passes through the unit components Ci and C(i+1) and is then received by the photodetectors 7. Light 30 which has passed through the unit component Ci is distributed as shown in (1) of FIG. 11, and light 31 obtained by passing the light 30 through the unit component C(i+1) is distributed as shown in (2) of FIG. 11. In this way, the voltages applied to the unit components Ci and C(i+1) are changed or adjusted by the electrode control circuit 9, so that the intensity of output light is varied as shown in FIG. 11, thereby enabling the optical operation such as filter characteristics to be performed.

Figure 12:
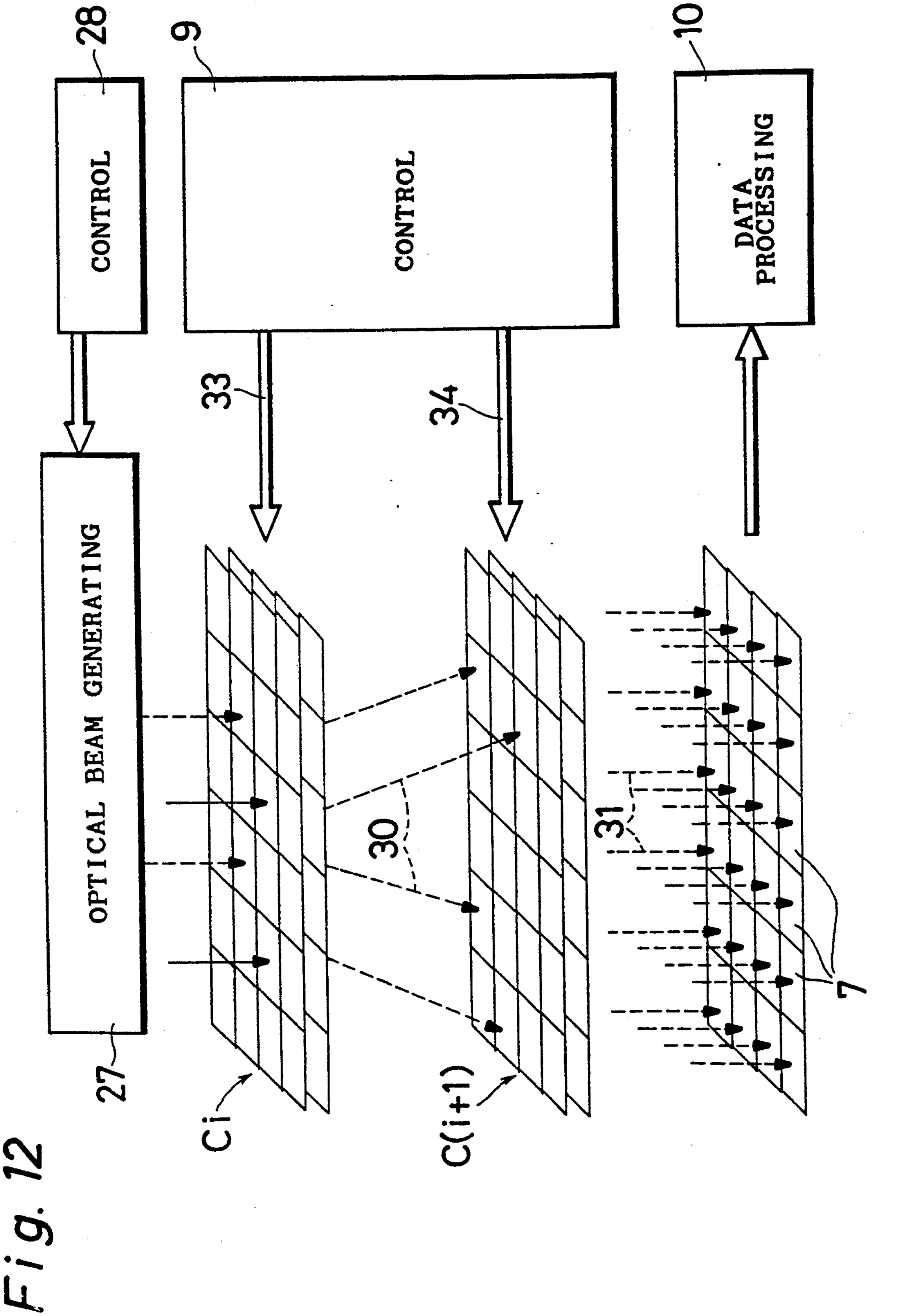
FIG. 12 is a simplified block diagram showing the whole configuration of a still further embodiment of the invention.

FIG. 12 is a block diagram showing a still further embodiment of the invention. The embodiment is constructed in a similar manner as the embodiment described above, and corresponding portions are designated by the same reference numerals. Light from the optical beam generation means 27 passes through the unit component Ci to be refracted thereby as indicated by reference numeral 30, and the refracted light 30 is distributed as shown in (1) of FIG. 13. This light 30 passes through the next unit component C(i+1) to obtain light 31 which is distributed as shown in (2) of FIG. 13. In this way, the voltages which are to be applied to the electrodes of the unit components Ci and C(i+1) are driven by the electrode control circuit 9, whereby a desired optical operation can be performed for obtaining the solution discovery or for obtaining the solution of the problem which the solution can not be uniquely determined.

In a still further embodiment, a mirror-like lenticular element having a convexo-concave form for a holography is provided instead of a photo detector 7 so as to produce an interference pattern of light 31, thereby enabling the state of a solution to be visually recognized. Furthermore, such an interference pattern may be detected by two-dimensional optical detection means or photodetectors which are arranged in a matrix form.

Figure 14:
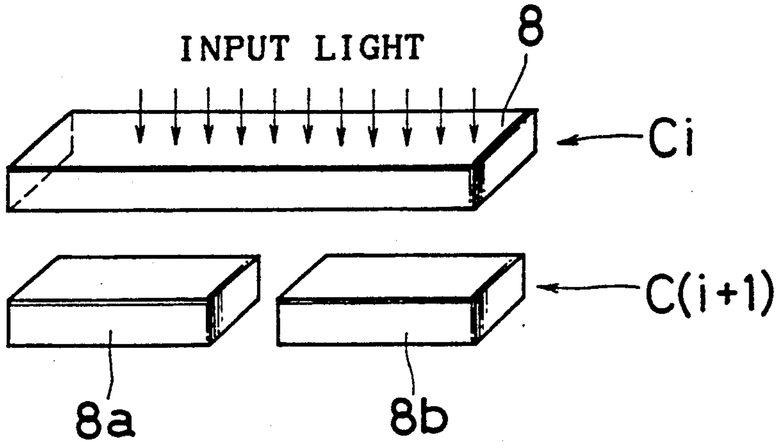
FIG. 14 is a perspective view showing an arrangement example of unit components Ci.

In the optical calculating apparatus 1 of the embodiment of FIG. 1, the unit component Ci of each stage has a configuration in which, with respect to the transmission portion 8 of the ith stage, the (i+1)th stage has transmission portions 8*a* and 8*b* of each having a length equal to the half of that of each transmission portion 8 of the ith stage are juxtaposed along the arrangement direction of the transmission portions 8 as shown in FIG. 14.

In the optical calculating apparatus 1 having such a configuration, incident light is normalized in wavelength and light amount at that wavelength, and then input to the unit component C1 of the first stage of the optical calculating apparatus 1. The optical calculating apparatus 1 of the embodiment shown in FIG. 1 has a configuration for performing a decision operation. Transmitted light from the unit component C1 of the first stage is input to the transmission portions 8 of the unit component C2 of the second stage, and transmitted light from each of the transmission portions 8 of the unit component C2 of the second stage is input to the four transmission portions 8 of the unit component C3 of the next stage. In this way, an image of input light which has entered into the unit component C1 of the first stage is multiexpanded every time when entering into the unit component C2 of the next stage. Therefore, an image formed on the photo detectors 7 is a distribution of a k number of relative solution probabilities in which there may be a solution obtained by performing an operation on the image of input light. The probability distribution is processed by the data processing circuit 10, and may be used in an application to a decision problem including equivocation, such as a fuzzy operation.

Moreover, when data of the probability distribution are subjected to a predetermined threshold process, it is possible to obtain a solution of the logic circuit which is realized as an image operation in the optical calculating apparatus 1, namely operation results.

The electrode control in which the transmittance state for input light at the transmission portions 8 of each unit component C is switched between the state wherein 100% of input light is transmitted in a predetermined direction and that wherein 0% of input light is transmitted (i.e., light is shielded) is referred to as a saturation control. The other electrode control in which the transmittance state for input light is controlled to have an arbitrary degree from 0% to 100% is referred to as a nonsaturation control. The above-mentioned saturation control may be applied to a problem in which the solution can be uniquely determined, such as a digital operation. On the other hand, the nonsaturation control may be used in an analog operation and also in a fuzzy operation and feature extraction process of an image in which a probability distribution of a solution is required.

In the optical calculating apparatus 1, the control of the voltage applied to the electrodes 2, 3 and 5 may be done during an optical operation. Alternatively, before input light is entered and an optical calculating operation is performed, the transmission portions 8 of each unit component C may be previously adjusted. In this case, an actual optical operation can obtain a solution immediately after input light is entered, and therefore it is possible to perform a very rapid optical operation which is not restricted by the control time of the electrodes or a response time such as the time required for the molecular structure of the modulation material layer 4 to be twisted. That is, this feature is very remarkable in the case of a filter operation, fuzzy operation, etc. in which the transmittance state for light of each unit component C is previously set.

Figure 15:
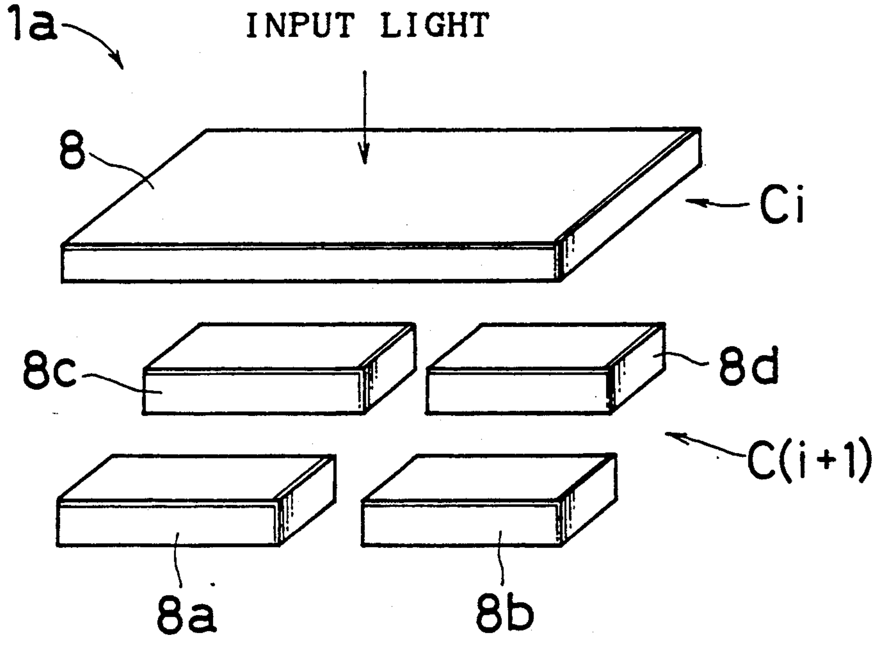
FIG. 15 is a perspective view showing another arrangement example of unit components Ci.

FIG. 15 is a view illustrating a configuration example of an optical calculating apparatus 1*a* which is another embodiment of the invention. In the unit component of the (i+i)th stage, for the transmission portion 8 of the ith stage, transmission portions 8*a*–8*d* each having an area which is for example a quarter of that of the transmission portion 8 are arranged two-dimensionally. According to this configuration example, it is also possible to attain the same effects as those described in conjunction with the embodiment described above.

Figure 16:
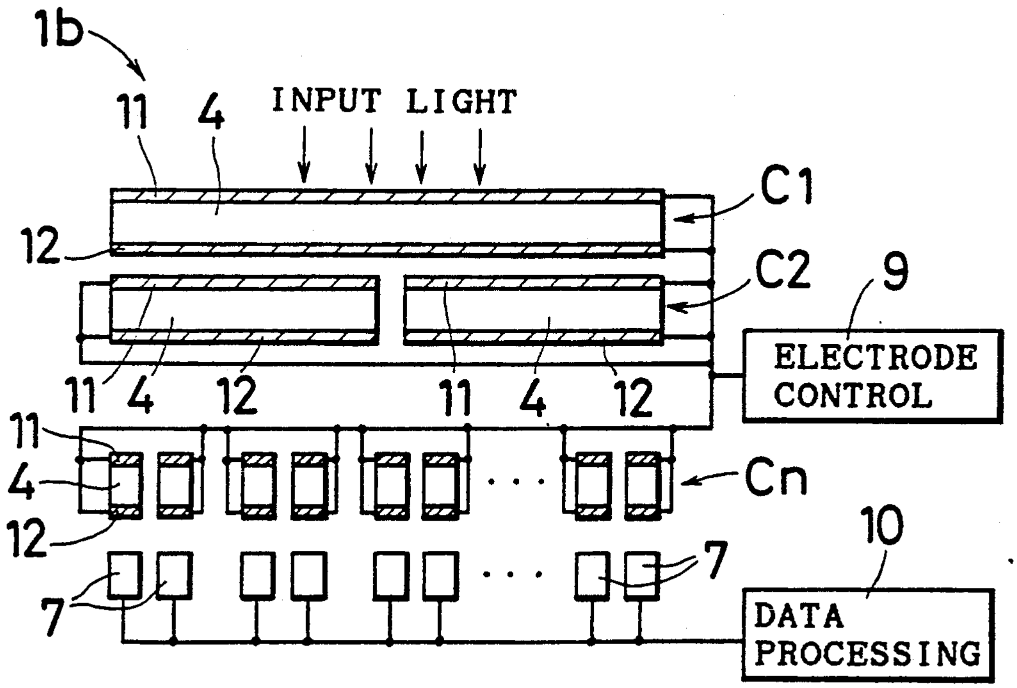
FIG. 16 is a diagram showing a configuration example of an optical calculating apparatus 1*b* which is another embodiment of the invention.

FIG. 16 is a diagram illustrating the configuration of an optical calculating apparatus 1*b* which is a further embodiment of the invention. A remarkable feature of the embodiment is that the unit component C has a configuration in which transparent electrodes 11 and 12 made of ITO (indium tin oxide) or the like are used as the electrodes and the modulation material layer 4 is sandwiched between the electrodes. Consequently, the transmission portions 8 of the unit component Ci (i=1 to n) of each stage are defined by the size of the transparent electrodes 11 and 12 of the respective stage. In the embodiment, accordingly, the transparent electrodes 11 and 12 in the unit component Ci of each stage reduce in length in the direction from left to right in FIG. 16 for example by half, with the advance of the stage number. When the number of the transmission portions 8 of the unit component Cn of the nth stage is k, therefore, a k number of photo detectors 7 are arranged in the same manner as the embodiment described above. The other construction of the embodiment is the same as that of the above-described embodiment. According to the optical calculating apparatus 1*b* having such a configuration, it is also possible to attain the same effects as those described in conjunction with the embodiment described above.

In the embodiments, the size of each unit component C is adjusted to be larger or smaller in accordance with the contents of an operation to be performed, so that the light amount can be controlled. The size of such a unit component cannot be adjusted by an electric field, and this can be used in an operation process in which coefficients for the operation are fixed.

The invention may be embodied in other specific forms without departing from the spirit or essential characteristics thereof. The present embodiments are therefore to be considered in all respects as illustrative and not restrictive, the scope of the invention being indicated by the appended claims rather than by foregoing description and all changes which come within the meaning and the range of equivalency of the claims are therefore intended to be embraced therein.

What is claimed is:

1. An optical calculating apparatus comprising:

a plurality of unit components stacked in a pile;

each one of the units having a pair of electrodes, glass plates and a transmittance control layer located between the electrodes and made of a material having a transparency property effective to vary at least one of the transmittance amounts or transmittance direction of incident light in accordance with the strength of an electric field applied between the electrodes;

means for adjustably applying a driving voltage to the electrodes of each of the unit components, to control strength of an electric field between the electrodes; wherein the electrodes are spaced in the direction perpendicular to the thickness direction and face each other; and at least one unit includes a pair of individual electrodes and each of which face a common electrode.

2. An optical calculating apparatus as claimed in claim 1, wherein the unit components in each layer of the pile define regions and are divided into $2[(\frac{1}{2})]^j$ regions (where j is an integer) in sequence of a thickness direction of the pile and there are at least three layers in the pile.

3. An optical calculating apparatus as claimed in claim 1, wherein the electrodes are spaced in the thickness direction face each other and are transparent.

4. An optical calculating apparatus as claimed in claim 1, wherein a voltage is applied across the electrodes facing each other so that the light transmittance is 100% or 0%.

5. An optical calculating apparatus as claimed in claim 1, wherein a voltage is applied across the electrodes facing each other so that the light transmittance has a value between 100% and 0%.

6. An optical apparatus as claimed in claim 1, wherein said transmittance control layer is a liquid crystal material.

7. An optical apparatus as claimed in claim 1, wherein said electrodes are also perpendicular to said glass plates.

8. An optical calculating apparatus comprising:
a plurality of unit components stacked in a pile;
each one of the units having a pair of electrodes, glass plates and a transmittance control layer located between the electrodes and made of a material having a transparency property effective to vary at least one of the transmittance amounts or transmittance direction of incident light in accordance with the strength of an electric field applied between the electrodes;
said pile is a laminated pile;
a region of each of the unit components through which incident light transmits having a predetermined area;
photoelectric converting means for converting a light which has passed through the lamination of the unit components to an electrical signal;
the electrodes are spaced in the direction perpendicular to the thickness direction with facing each other; and
wherein at least one unit includes a pair of individual electrodes each of which face a common electrode.

9. An optical apparatus in claim 8, wherein said electrodes are also perpendicular to said glass plates.

10. An optical calculating apparatus comprising:
a plurality of unit components stacked in a pile;
each one of the units having a pair of electrodes, glass plates and a transmittance control layer located between the electrodes and made of a material having a transparency property effective to vary at least one of the transmittance amounts or transmittance direction of incident light in accordance with the strength of an electric field applied between the electrodes;
said pile is a laminated pile;
a region of each of the unit components through which incident light transmits having a predetermined area;
photoelectric converting means for converting a light which has passed through the lamination of the unit components to an electrical signal;
each unit includes an analyzer layer and a polarizer layer each in contact with different glass plate and both layers in contact with the transmittance layer; and
said analyzer layer and polarizer layer are formed of polyamide.

11. An optical calculating apparatus comprising:
a plurality of unit components stacked in a pile;
each one of the units having a pair of electrodes, glass plates and a transmittance control layer located between the electrodes and made of a material having a transparency property effective to vary at least one of the transmittance amounts or transmittance direction of incident light in accordance with the strength of an electric field applied between the electrodes;
said pile is a laminated pile;
a region of each of the unit components through which incident light transmits having a predetermined area;
photoelectric converting means for converting a light which has passed through the lamination of the unit components to an electrical signal; and
wherein said photoelectric converting means is a charge couple device.

* * * * *